July 18, 1939.  W. H. CHURCHILL  2,166,889

REINFORCEMENT MEMBER

Filed Jan. 7, 1938

Inventor:
Widmer H. Churchill.
by Walter J. Jones Att'y.

Patented July 18, 1939

2,166,889

UNITED STATES PATENT OFFICE 2,166,889

REINFORCEMENT MEMBER

Wilmer H. Churchill, Saugus, Mass., assignor to United-Carr Fastener Corporation, Cambridge, Mass., a corporation of Massachusetts Application January 7, 1938, Serial No. 183,846

3 Claims. (Cl. 189—88)

The object of my invention is to provide an improved reinforcement for moldings and the like structures.

Referring to the drawing, in which I have illustrated a preferred embodiment of my invention:—

Figure 1:
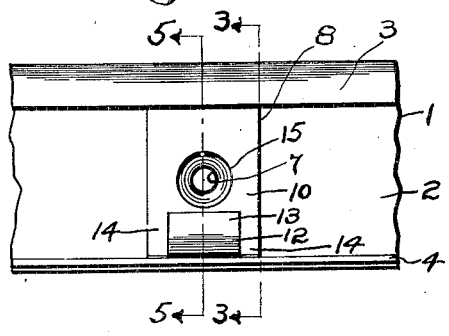
Figure 1 is a rear view of a portion of a hollow molding having one of my improved reinforcements assembled therewith.

An object of my invention is the provision of an improved reinforcement for molding strips and the like. My invention is directed particularly to a reinforcement which may be snapped into engagement with a hollow molding in an easy and efficient manner so as to be rigidly secured thereto and at the same time provide means whereby it may be efficiently assembled with a hollow molding so as to take up variations in dimensions along its length.

Referring to the preferred use of my invention as illustrated by the drawing, I have shown a portion of a molding 1 of the type commonly used in automobile manufacturing for outlining a rear window recess. The molding 1 has a front wall 2 which, in my preferred form, is of curved cross-section and a side wall 3 at one end of the front wall 2, and a side wall 4 at the other end of the front wall. The side walls 3 and 4 may be in inclined relation one to another, as most clearly shown in Figs. 3-5. The molding 1 is preferably secured to a support such as the body 5 (Fig. 3) of an automobile by an attaching means which may be a screw 6 extending through a countersunk aperture 7 in the front wall 2 of the molding into engagement with the automobile body 5, as most clearly shown in Fig. 3. My improved reinforcement 8 is assembled with the molding 1 within the hollow defined by the front wall 2 and the side walls 3 and 4 and is adapted to act as a reinforcement for the molding when the front wall 2 is subjected to inward pressure, as during turning of the screw 6 into threaded engagement with the support 5. At the same time the reinforcement 8 provides a bearing portion adapted to engage a portion 9 (Fig. 3) of the support 5 when the molding 1 is finally assembled with the support.

Referring in detail to my improved reinforcement 8, I have provided one which is preferably made from one piece of spring steel. The reinforcement, in my preferred form, has a base 10 which is of curved cross-section so as to increase the resiliency of the member and at the same time provide a greater bearing surface for engagement with the inner surface of the front wall 2 of the molding for supporting the same when the parts are assembled together. One end of the base 10 has a curled portion 11 adapted to engage the side wall 3 of the molding in final assembly of the parts. The opposite end of the base 10 from that having the curled portion 11 has a curved bearing portion 12 providing a free end portion 13 which provides a bearing surface for a portion 9 of the automobile body 5 when the parts are finally assembled together. As a means for securing the reinforcement to the molding, I have provided a pair of spring fingers 14 at that end of the reinforcement having the curved bearing portion 12. The fingers 14 normally extend from the base 10 beyond an end of the reinforcement and are preferably disposed on opposed sides of the curved bearing portion 12. The outermost free ends of the fingers 14 are adapted to engage the wall 4 of the molding when the reinforcement is finally secured to the molding, as will be described.

Figure 2:
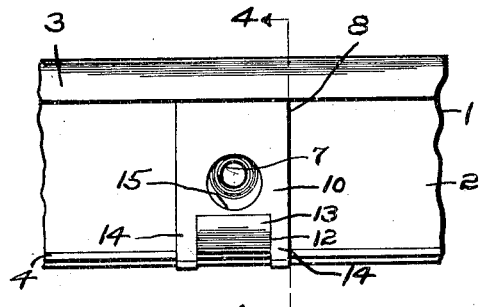
Fig. 2 is a view similar to that of Fig. 1 showing the method by which my improved reinforcement is assembled with the molding.
Figure 3:
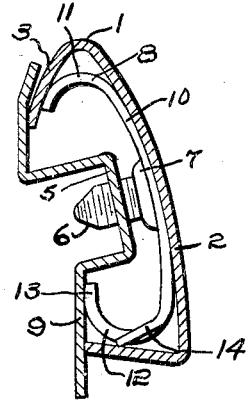
Fig. 3 is an enlarged section taken along the line 3—3 of Fig. 1 and showing the molding secured to a supporting structure.
Figure 4:
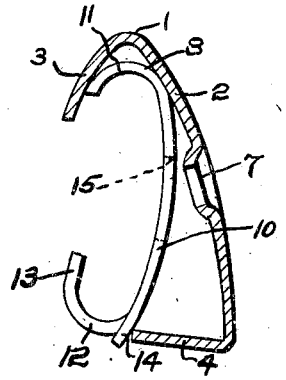
Fig. 4 is an enlarged section taken along the line 4—4 of Fig. 2.
Figure 5:
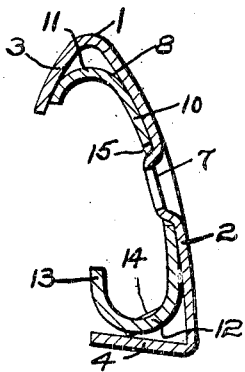
Fig. 5 is an enlarged section taken along the line 5—5 of Fig. 1.
Figure 6:
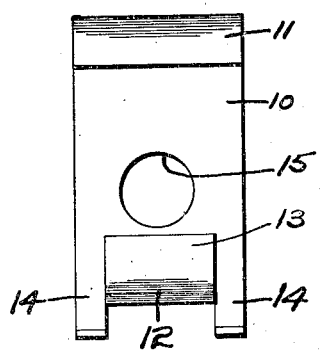
Fig. 6 is a rear view of my reinforcement per se.
Figure 7:
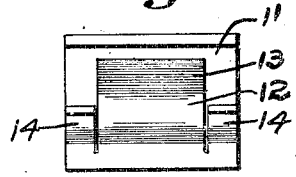
Fig. 7 is an end view of the reinforcement shown in Fig. 6.

Assembly of the reinforcement 8 with the molding is a relatively simple matter and is carried out through moving the reinforcement into first position, as shown in Figs. 2 and 4, with the curled portion 11 of the reinforcement disposed in the angle formed by the side wall 3 and the front wall 2 of the molding with the result that the free end of the curled portion 11 engages the inner surface of the side wall 3 and a portion of the reinforcement at substantially the junction of the curled portion 11 and the base 10 is engaged with the front wall 2 of the molding. As a result of the relative dimensions of the reinforcement, in normal position, and the molding, material of the finger portions 14 adjacent their free ends are disposed in engagement with the outermost free edge of the side wall 4 of the molding, as most clearly shown in Figs. 2 and 4. Next, pressure is exerted upon the bearing portion 13, or other suitable part of the reinforcement, to spring the reinforcement into final attached position with the molding. In springing the reinforcement into the molding, the base 10 of the reinforcement is contracted slightly as a result of the natural resiliency of the same and the fingers 14 are contracted by engagement with the inner surface of the side wall 4 of the molding so that in final assembly of the reinforcement with the molding the fingers 14 are disposed in a position substantially as shown in Figs. 3 and 5 with the lower corner of the free edges of the same in frictional engagement with the inner surface of the side wall 4 of the molding whereby the reinforcement is firmly secured to the molding. It will be noticed that the base 10 of the reinforcement has an aperture 15 therein which aligns with the aperture 7 of the front wall 2 of the molding when the parts are in final assembly (Fig. 5) so as to permit passage of an attaching means 6 through the reinforcement when the molding is secured to the automobile body. Finally, the molding 1, with reinforcement assembled therewith, is secured to the body 5 of the automobile by the screw 6 in the manner shown in Fig. 3.

Thus it will be noticed that by my construction of the reinforcement, wherein I have provided a pair of yieldable spring fingers at one end, I am enabled to assemble the reinforcement with the molding in a quick and efficient manner in a way to firmly secure the reinforcement with the molding at any position along the length thereof even though the dimensions of the molding may have certain variations. As it is difficult, if not impossible, to manufacture a molding strip of the type illustrated in the drawing so as to have no variations in dimensions, it will be understood that my improved reinforcement fulfills a useful purpose in the art.

Although I have illustrated and described a preferred embodiment of my invention, I do not wish to be limited thereby because the scope of my invention is best defined in the following claims.

I claim:

1. A reinforcement for a hollow molding or the like comprising a base, a yieldable curved portion at one end of said base adapted to engage a side of said molding and at least one spring finger normally extending beyond the opposite end of said base, said finger having an edge at its outermost free end for engaging another side of said molding whereby said reinforcement is secured to said molding.

2. A reinforcement for a hollow molding and the like comprising a yieldable apertured base, a yieldable portion at one end of said base for engaging one side of said molding and a pair of spring fingers at the opposite end of said base yieldable relative to said base and relative to said yieldable portion and having free ends adapted for positive engagement with another side of said molding whereby said reinforcement is secured to said molding.

3. A reinforcement for a hollow molding and the like comprising a curved base, a curled portion at one end of said base adapted to engage a side of said molding, a curved bearing portion at the opposite ends of said base from said curled portion and spring fingers at the end of said base having said curved bearing portion, said fingers being disposed on opposite sides of said bearing portion and adapted to engage another side of said molding whereby said reinforcement is secured to said molding.

WILMER H. CHURCHILL.